United States Patent [19]
Sturgeon

[11] 3,849,908
[45] Nov. 26, 1974

[54] METHOD AND MEANS FOR TRAINING DRIVERS TO OPERATE AUTOMOBILES

[76] Inventor: James L. Sturgeon, 4544 Via de la Plaza, Yorba Linda, Calif. 92686

[22] Filed: Mar. 12, 1973

[21] Appl. No.: 340,091

Related U.S. Application Data

[63] Continuation-in-part of Ser. No. 212,797, Dec. 27, 1971, abandoned, which is a continuation-in-part of Ser. No. 13,537, Feb. 24, 1970, abandoned.

[52] U.S. Cl. .................................. 35/11, 180/70 R
[51] Int. Cl. ........................................... G09b 19/16
[58] Field of Search ....... 35/11; 280/1.11 R; 73/117

[56] References Cited
UNITED STATES PATENTS

| | | | |
|---|---|---|---|
| 1,723,744 | 8/1929 | McKenna | 35/11 |
| 1,747,105 | 2/1930 | Conroy | 35/11 |
| 1,922,746 | 8/1933 | Reeder | 35/11 X |
| 1,964,532 | 6/1934 | Platzer | 73/117 |
| 2,627,674 | 2/1953 | Wilson | 35/11 |
| 3,022,846 | 2/1962 | Thompson | 280/1.11 R X |
| 3,051,519 | 8/1962 | Sudeikis | 403/43 |
| 3,526,042 | 9/1970 | Nelson | 35/11 |

FOREIGN PATENTS OR APPLICATIONS

| | | | |
|---|---|---|---|
| 727,997 | 12/1966 | Italy | 35/11 |
| 66,040 | 3/1969 | Germany | 35/11 |

OTHER PUBLICATIONS
Photograph and Copy of Text from Washington Post, Dec. 7, 1939, Section 2, page 15, captioned "100 Pupils learn...".

"Teacher's Manual for Sportsmanlike Driving," pages 112–119, and inside back cover, 2nd edition, Rec'd. May, 1952.

*Primary Examiner*—Wm. H. Grieb
*Attorney, Agent, or Firm*—Fulwider Patton Rieber Lee & Utecht

[57] ABSTRACT

A method of teaching a pupil to drive which includes the use of a tethered automobile having its wheels resting on rollers which enables the wheels to rotate and be steered and the gears to be shifted without movement of the automobile. The pupil is instructed to perform steering movements and gear shifting movements coordinated with movement of the automobile accelerator to learn to relate the driving force applied to the automobile front wheels to the steering movements. The pupil is then transferred to an untethered automobile which is free for driving movement along the ground and is instructed to drive the untethered automobile utilizing the coordinated steering and gear shifting movements learned in the tethered automobile. The untethered automobile may be a mini-car which can be driven around a mini-range which incorporates traffic features corresponding to those encountered in normal driving situations.

2 Claims, 10 Drawing Figures

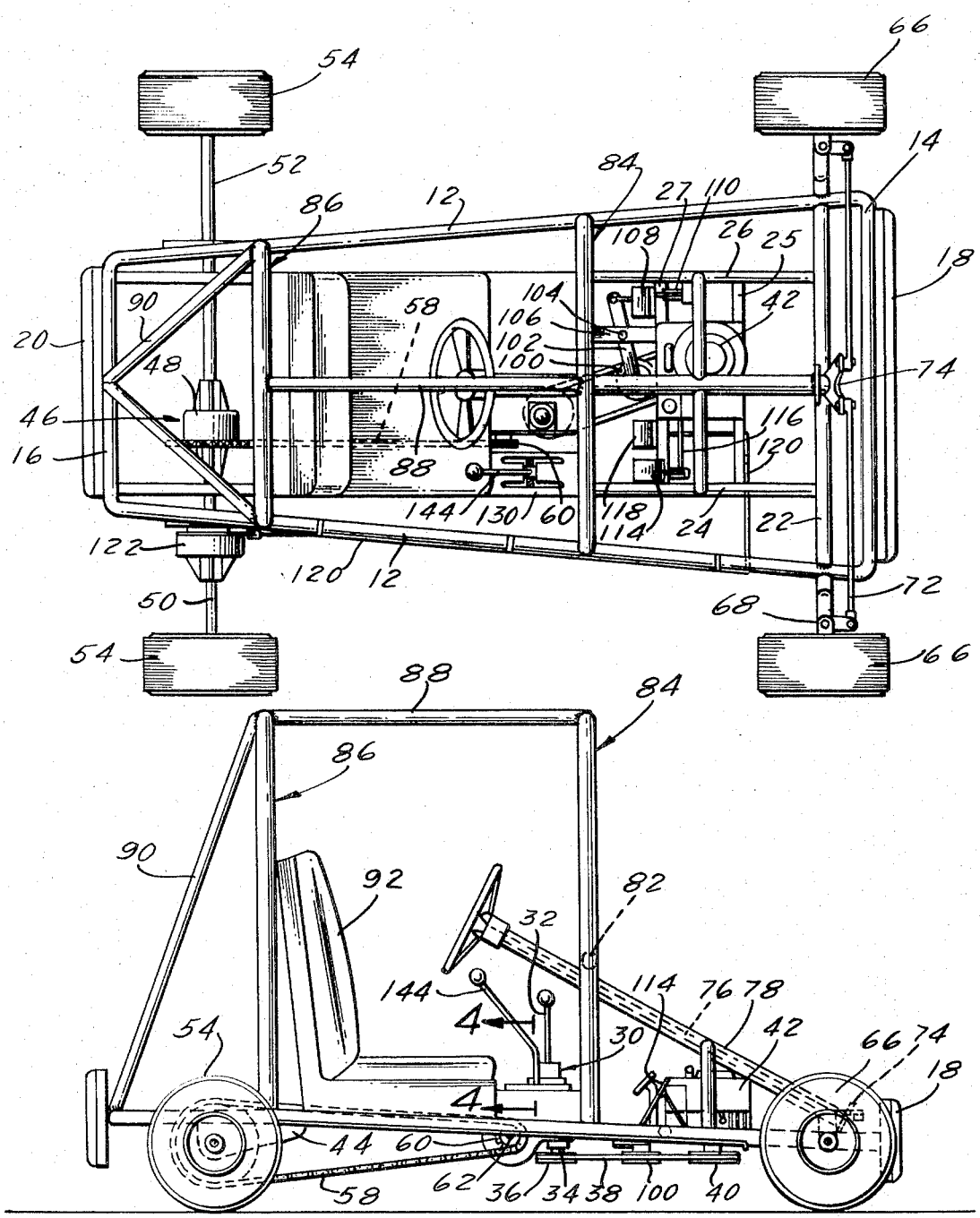

James L. Sturgeon,
INVENTOR.

BY
Attorney

PATENTED NOV 26 1974 3,849,908
SHEET 4 OF 4
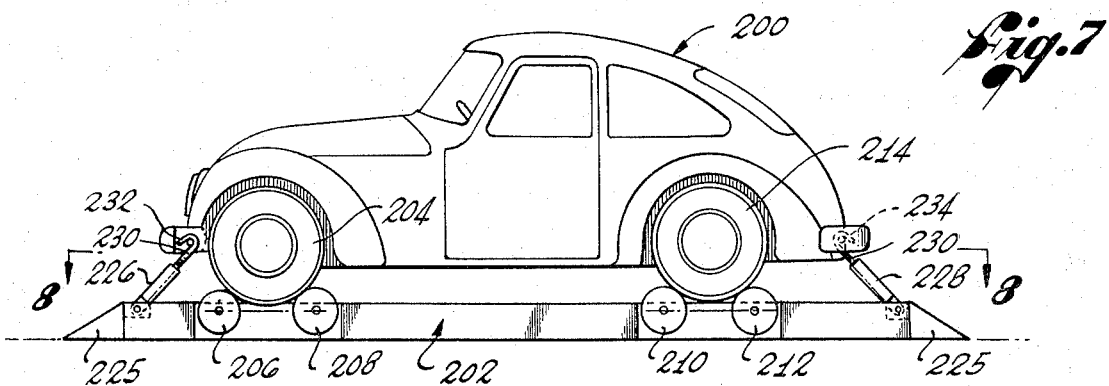
Fig. 7
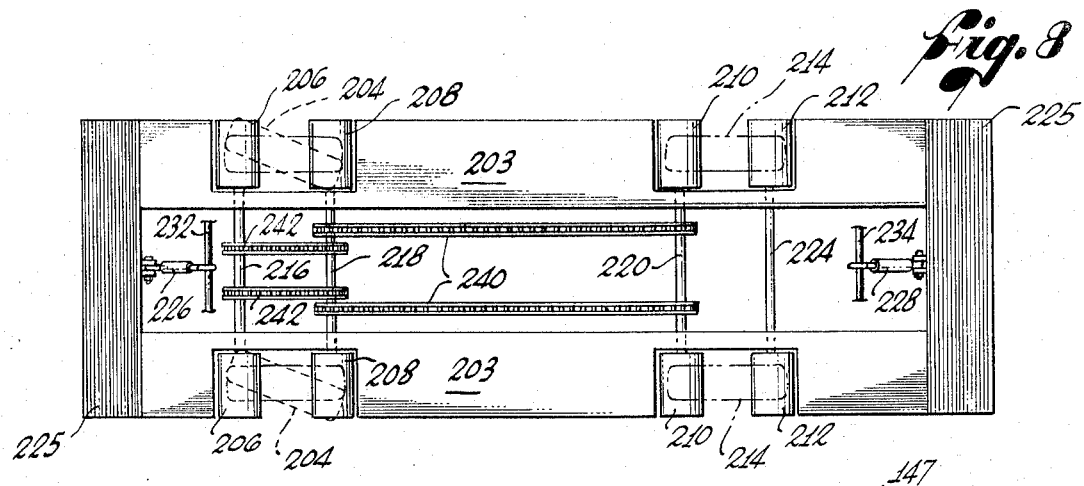
Fig. 8
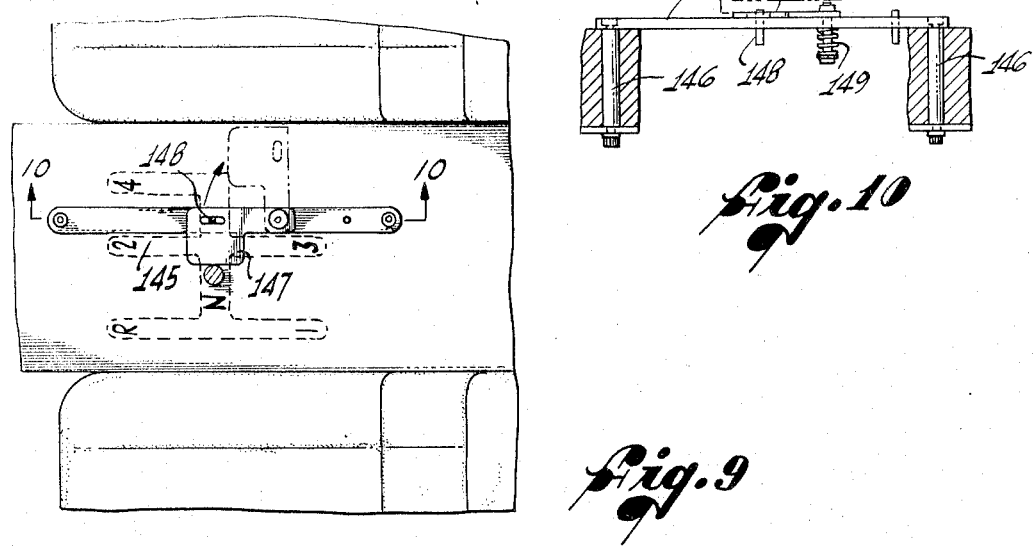
Fig. 9
Fig. 10

METHOD AND MEANS FOR TRAINING DRIVERS TO OPERATE AUTOMOBILES

CROSS-REFERENCE TO RELATED APPLICATIONS

This application is a continuation-in-part of my copending application of the same title, U.S. Ser. No. 212,797, filed Dec. 27, 1971 now abandoned, which was a continuation-in-part of my earlier application, now abandoned, entitled "Means For Training Drivers For Operating Automobiles, " U.S. Ser. No. 13,537, filed Feb. 24, 1970.

BACKGROUND OF THE INVENTION

This invention relates to driver education and more particularly to the training of drivers by the use of a consecutive sequence of training in tethered and moving automobiles.

In teaching beginners to drive, a very early step requires overcoming the apprehension some people have, particularly children and persons of a timid disposition, in controlling large moving machinery such as an automobile In addition, it is helpful for a beginner to have some feel of the steering and motor operation involved in driving before his first instruction on a moving vehicle. For this purpose it is quite common to perform an early stage of instruction with the pupil in a parked automobile with the engine running but the wheels braked and stationary and the transmission out of gear. In such a parked vehicle, the degree of confidence and control which can be developed by the pupil without placing the vehicle actually in motion is extremely limited and no effective development of coordination and confidence can be achieved prior to commencement of instruction on a moving vehicle.

So far as Applicant is aware, no satisfactory system has yet been developed for developing coordination of certain basic driving motions and development of confidence in control over machinery in pupils in the earliest stage of driving instruction prior to instruction on a moving vehicle.

SUMMARY OF THE INVENTION

A preferred embodiment of the invention involves the teaching of pupils to drive by a teaching sequence which involves preliminary instruction of the pupil in a tethered automobile mounted on a stationary platform with its wheels resting upon rollers enabling the front wheels to rotate and be steered and the gears to be shifted without movement of the automobile. In the next stage in the sequence, driving instruction takes place in an untethered, moving automobile utilizing the coordinated driving movements learned in the tethered automobile.

In the training of pupils, such as children who may tend to be overawed at their first exposure to control of moving machinery, the instruction time spent in the tethered automobile enables the pupil to learn free of the fear of collision inherently associated with the use of a moving vehicle. By removing that source of anxiety, the pupil is able to devote his undistracted learning attention to mastering basic engine-steering coordination and at the same time builds his confidence so that in the subsequent step he is adequately prepared for further instruction in a moving automobile.

To carry out this instructional method, a tethered automobile, preferably a relatively small car, is mounted on a stationary platform with its front wheels resting on rollers which enable the front wheels to rotate without movement of the automobile along the ground. Variable driving force is applied to the front wheels to rotate them in proportional response to movement of the automobile accelerator by the pupil. The pupil is instructed to perform steering movements of the front wheels coordinated with movement of the automobile accelerator to relate the driving force applied to the automobile front wheels to the steering movements. The pupil is also taught how to shift gears and learns to shift without taking his eyes off the road. The pupil is then transferred to an untethered automobile which is free for driving movement along the ground. The pupil is then instructed to drive the untethered automobile utilizing the coordinated steering and accelerator movements and gear shifting technique learned in the tethered automobile.

The stationary platform on which the automobile is mounted also includes rear rollers supporting the rear wheels of the automobile for rotation. If the automobile has a rear wheel drive, a chain and sprocket drive is provided between the rear rollers and the front rollers. Thus the rear wheels drive the rear rollers and the rotational motion is transferred to the front rollers to rotate the front wheels. As the pupil steers the front wheels from side to side, the resistance they impose to the turning of the front rollers varies imposing a varying load which is transmitted back, via the drive train, the rear rollers and the rear wheels, to the engine in an analogous manner to that in which steering motion on the road transfers differing loads back to the engine. Thus, the pupil may be taught to increase accelerator movement at appropriate times, to decrease accelerator movement at other appropriate times, and to shift gears, all as he would in driving an automobile on the road.

The untethered automobile to which the driver is transferred from the tethered automobile, is preferably another automobile identical to the tethered automobile or of a similar kind. Preferably, the subsequent driving instruction on the untethered automobile is performed on a mini-range utilizing mini-cars correspondingly scaled down in proportion to the size of the range.

A further aspect of the invention involving the use of mini-cars and a mini-range is the ability of a number of drivers on the mini-range to be instructed concurrently by a single instructor communicating with the drivers separately (or in unison on occasion) by means of loud hailing equipment, radio communication or other means of remote communication. The capability to instruct a number of pupils utilizing a single instructor in a single period of time is particularly attractive to educational establishments such as high schools and primary schools where individual pupil instruction on a one-to-one basis may not be feasible for considerations of either cost or instructor availability.

If mini-cars are utilized, the mini-cars are of relatively small size but provide the driver with the same conditions, circumstances and feel that a full size automobile would give a person while driving. The mini-car has a power train system, including a clutch and transmission, through which the power from the engine is transmitted. The transmission has three speeds forward and a reverse but may be of such character that shifting cannot be effected while the mini-car is in motion or can be limited as to the gears that can be used. A dummy shift mechanism may be provided which the driver uses if the regular shift is not available while the mini-car is in motion so that the driver may go through the various shift positions, using the clutch in the usual manner, and thus become thoroughly familiar with the shifting procedure.

The speed of the mini-car for any selected gear is variable according to the depression of the accelerator which the car has, but is subject to the control of a governor on the engine.

Since the driver either cannot shift the transmission while the car is in motion or is limited to a predetermined choice of gears, the speed desired is initially selected by the instructor and the car cannot be driven too fast for the experience of the driver. This is an important safety factor.

The driving range is in miniature but is of sufficient size to accommodate the car and provide any type of traffic or driving situations desired. Various exercises are used for developing the necessary driving techniques.

BRIEF DESCRIPTION OF THE DRAWINGS

Referring to the drawings, which are for illustrative purposes only:

FIG. 1 is a schematic top plan view of a car embodying the invention;

FIG. 2 is a side elevational view thereof;

FIG. 7 is a side view of the tethered automobile shown in FIG. 6 with parts of the automobile shown in cross-section;

FIG. 8 is a top view showing a platform used to support the automobile shown in FIG. 7;

FIG. 9 is a top view of a lockout device for disabling a gearshift mechanism of the automobile shown in FIG. 7; and FIG. 10 is a cross-sectional side view of the lockout device shown in FIG. 9 taken along the lines 10—10 therein.

DESCRIPTION OF THE PREFERRED EMBODIMENTS

Figure 3:
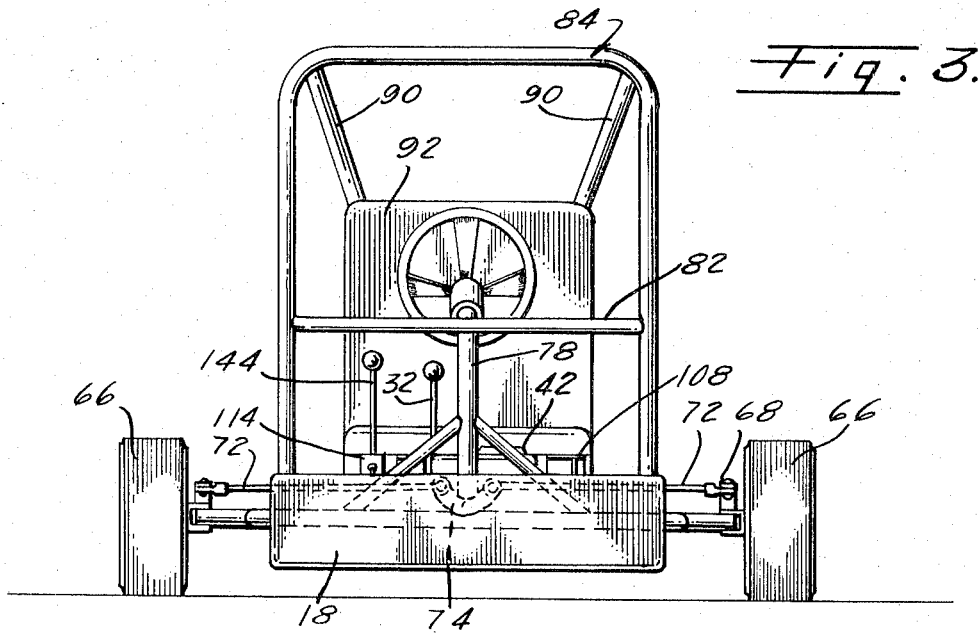
FIG. 3 is a front elevational view.

Referring to FIGS. 7 and 8 of the drawings, a beginning driver, or pupil, is given some of his earliest instruction in a tethered automobile 200 mounted on a stationary platform 202 which rests on the ground. The tethered automobile, in the preferred embodiment, is a conventional four-wheel, rear wheel drive automobile having a transmission which includes a manual gearshift. Preferably it is of the so-called sub-compact variety of vehicles such as for example the automobiles manufactured by Subaru Company of Japan, or Volkswagen Company of Germany, although other types of small automobiles may be utilized, all of which are included in the phrase mini-cars as used herein.

The platform 202 is a low rectangular box-like structure having two parallel flat upper walls 203 along its edges which function as wheel tracks for the wheels of the vehicle to run along as it is driven onto the platform. The automobile front wheels, identified as 204, rest on two spaced pairs of forward rollers 206 and 208 which are positioned on opposite sides of the transverse center line of the front wheels to provide balanced support. Two spaced pairs of rollers 210 and 212 support the rear wheels of the automobile, identified as 214. The rollers in each of the pairs 206, 208, 210 and 212 are supported at the ends of shafts 216, 218, 220 and 224, respectively, which are rotatably mounted on the platform 202 extending transversely across it. Hollow wells are cut in the upper walls 203 in the region of the rollers 206, 208, 210 and 212 to accommodate the rollers. At the front and rear ends of the platform it is provided with sloped ramps 225 to enable the vehicle to be driven on and off the platform when it is not required for instructional purposes.

To hold the vehicle in fore and aft alignment on the platform it is tethered at its front and rear ends by holddown clamps 226 and 228. The holddown clamps each include a hooked rod 230 which is looped around an adjacent one of two tie bars 232 and 234 which are permanently secured to the body of the automobile in the bumper area, by bolting, welding or the like. The body of each of the holddown members 226 and 228 is internally threaded to engage corresponding threaded portions on its associated hooked rod 230 and may be threaded down like a turn buckle to exert downward force on the front and rear wheels. By suitable adjustment of the holddown members, the force exerted by the wheels on the underlying rollers, and the degree of frictional engagement between the automobile wheels and the rollers on which they rest can be adjusted to a desired predetermined value.

To transmit rotation from the driven rear wheels 214 of the automobile to its front wheels 204, a drive train is interposed between the rear rollers and the front rollers. The drive train includes two parallel drive chains 240 extending between the axles 218 and 220 passing about fixed sprockets secured to those axles. Thus, as the rear wheels 214 rotate, driving the rear rollers 210, the rotational motion is transmitted through the drive chain 240 to drive the front rollers 208 which turn the automobile front wheels 204.

In the earliest stages of instruction of a beginning driver, he is placed in the tethered automobile 200 and instructed in the operations of starting the engine, placing it in gear and shifting gears to drive the rear wheels at various speeds. After he has gained proficiency in these basic skills the pupil is instructed to conduct steering movements of the front wheels from side to side, which, because they are rotating, will turn with relative ease as they would turn if the automobile were being driven on the road. By contrast, if the front wheels were stationary and resting on the ground like a normal parked vehicle, an unnaturally high degree of turning force would be required. The pupil is thus enabled to gain familiarity with steering motions of the vehicle in a comparable manner to what would be felt during actual road driving.

The next phase of the pupil's instruction involves co-ordination of the steering movements with increase and decrease of the driving force supplied to the wheels in coordinated relation to the steering movements. The previously mentioned rollers 206 and 208 are sufficiently wide to permit side-to-side movements of the front wheels 204, as shown for example in FIG. 8. When the wheels are steered to a skewed position, the frictional engagement force between the rollers and the wheels alters and this creates a corresponding torque change which is transmitted back through the driving chains 240 to the rear wheels 214. Thus, steering motion of the front wheels produces a change in the loading on the engine in an analogous manner to that experienced during steering movement in road driving. The pupil can be instructed to increase or decrease the driving force by movement of the automobile accelrator to vary the driving force exerted on the wheels in relation to their steering movement, thus developing his coordination between steering and accelerator movements. After some hours of practice, a pupil of average competence should have developed his coordination between steering and accelerator movements enough for him to be ready to proceed to the next stage in his driver training, i.e., instruction on a moving automobile.

The use of the tethered automobile in the very first stages of driver training, particularly where the pupil is a child or timid person likely to be initially apprehensive, has the great advantage that it removes the fear of collision as a factor present in the pupil's mind during his first contact and control over an automobile with a running motor. As a result, the pupil's learning ability is unimpaired by anxiety or stress due to apprehension of collision, in contrast to a learning situation where his initial instruction for the first time is on a moving vehicle. In addition, during the period that the pupil is developing skill in coordination between steering, accelerator movements and gear shifting, he acquires a familiarity with the automobile which enables him to build his confidence naturally to the point at which he is ready to proceed to the next stage of driver training on a moving automobile.

Thus in the following stage of the teaching method of the invention, the pupil is transferred to a second automobile 250 (FIG. 6) which is untethered, and free for motion. In the second automobile 250, he is instructed to drive the automobile utilizing the coordinated accelerator and steering motions learned in the tethered automobile. Thus his driving training proceeds naturally from the tethered to the moving automobile in a smooth, naturally flowing sequence.

Figure 6:
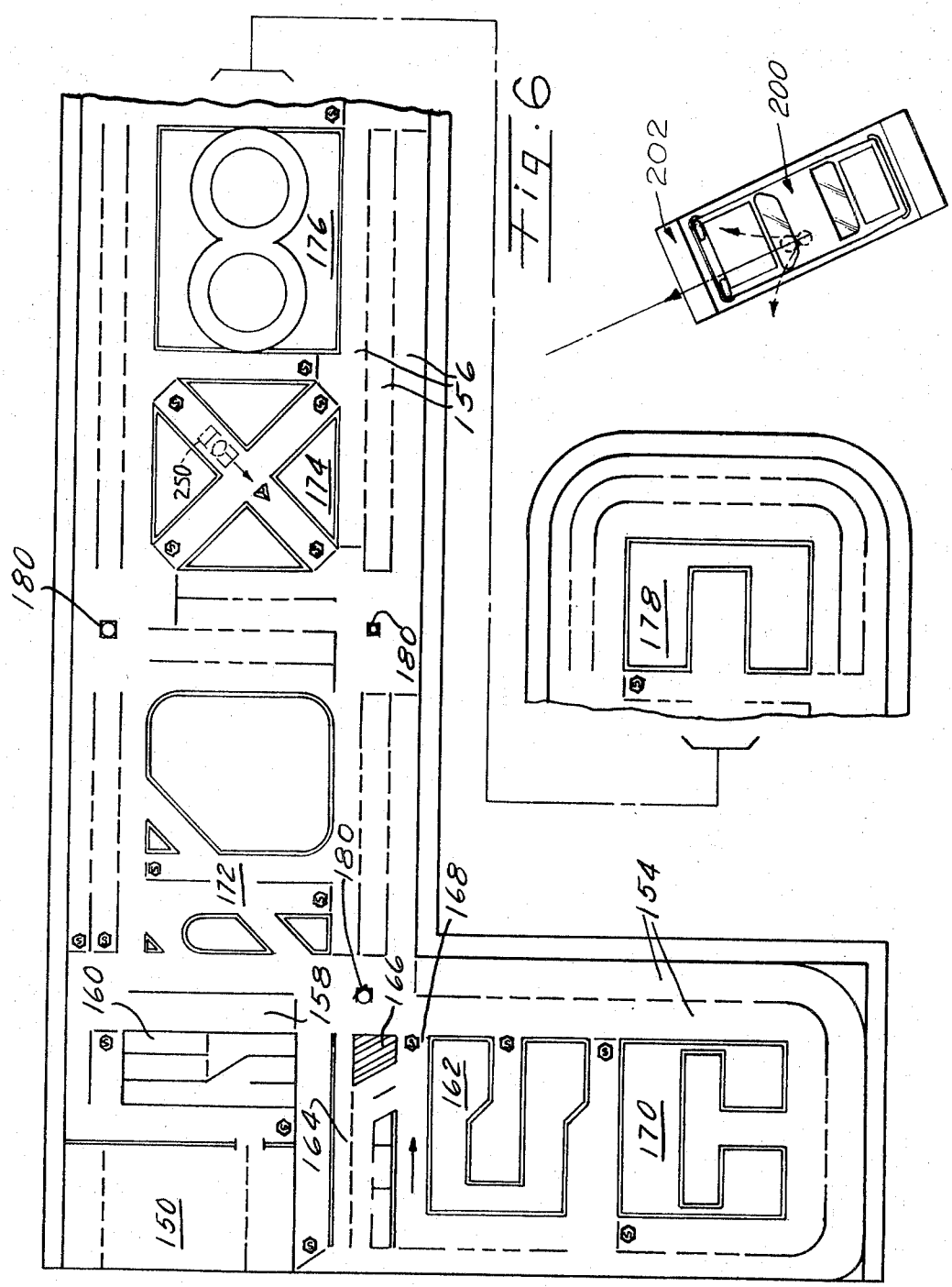
FIG. 6 is a plan view of the driving range of the invention and showing a tethered automobile so positioned as to enable its driver to observe other automobiles being driven on the driving range.

The second automobile is preferably an automobile of similar make and construction to the tethered automobile with subsequent driving instruction being performed on any suitable road or ground surface. However, in the preferred embodiment of the invention, the second automobile 250 is a mini-car which is driven about a correspondingly scaled down driving range hereinafter referred to as a mini-range as shown in FIG. 6, which is discussed in more detail hereinafter. The previously described tethered automobile 200 and the platform 202 on which it is mounted are positioned in viewing relation to the driving range so that a pupil in the driving position in the tethered automobile 200 can observe the motion of one of the free-moving automobiles 250 on the driving range. With this arrangement, the driving instructor can instruct the pupil in the tethered automobile to observe the motion of the vehicle 250 on the driving and conduct steering and driving motions in the tethered automobile corresponding to those being performed by the observed moving vehicle 250. In this way, the pupil in the tethered automobile has his interest continuously stimulated by the need to remain alert to the movements of the moving vehicle and, while he is so performing, the instructor is free for other duties.

Referring more particularly to FIGS. 1, 2 and 3, there is shown a mini-car for use with the method of my invention utilizing a mini-range. The mini-car has a main or outer frame with longitudinal side member 12 and interconnecting transverse front and rear members 14 and 16, with front and rear bumpers 18 and 20 attached thereto by any suitable means such as bolts or the like, not shown. There is also an inner frame comprising a front transverse member 22 welded, or otherwise, suitably secured at the ends to the longitudinal outer frame member 12. The inner frame also includes longitudinally extending members 24 and 26.

There are, also transverse frame members 25 and 27 for the inner frame adjacent the front end of the vehicle. The outer and inner frame parts comprise the frame or frame means of the car which supports various parts, to be described hereinafter and to which said parts are secured. Various other parts of the car are attached to the frame.

Substantially at the longitudinal center of the vehicle is a transmission, indicated generally at 30, of well-known type, such as for example a transmission of Lauson-Power Products, which is secured to the cross-members 25 and 27 of the inner frame by any suitable well-known means, such as bolts. The transmission 30 is of the stick shift type, said stick shift lever being indicated at 32, and said transmission 30 has three speeds forward and a reverse. The power input is at the bottom, there being a vertical shaft 34 to which a pulley 36 is secured. A belt 38 connects the pulley 36 to a pulley 40 at the underside of an engine and driven thereby, said engine being indicated generally at 42, which is secured to transverse frame members provided therefor by bolts or the like, not shown. The engine may be of any suitable character such as a low horsepower, a 5 horsepower, for example. One type of engine that may be used is a Briggs and Stratton, manufactured by Briggs and Stratton Corp. of Milwaukee, Wisconsin.

At the rear end of the vehicle are plates 44, secured to the underside of the outer frame members 12 for operably carrying a rear axle assembly, indicated generally at 46, and which includes the differential gearing in housing 48 and from the sides of which extend axles 50 and 52. The axles 50 and 52 are provided with rear wheels 54. A sprocket 56 is part of the power train and is operably disposed adjacent one side of the differential housing 48.

A chain 58 connects sprocket 56 with a smaller sprocket 60 on the outer end of a horizontal shaft 62 extending from the side of the transmission 30.

Adjacent the front end of the frame of the vehicle are the front wheels 66 operably carried on bell cranks 68 on vertical spindles 70, operably carried adjacent the ends of the transverse frame member 22. The outwardly extending arms of the bell cranks have the usual well-known axles for front wheels of automotive vehicles. The other arms of the bell cranks are connected by rods 72, with respective arms of a yoke 74 attached to the lower end of the steering shaft, the opposite end of said steering shaft having the steering wheel 76 operably attached thereto. Shaft 76 is disposed in steering column 78, secured in place by brace members 80 secured to the longitudinal members 24 and 26 of the inner frame. The column 78 is also secured to a transverse member 82, having its ends secured by welding, or the like, to the depending arms 84 of the front member, indicated generally at 84, of the roll bar assembly. Member 84 is in the general shape of an inverted U and there is a similar member, indicated generally at 86, adjacent the rear of the vehicle. A longitudinally extending bar 88 connects the upper ends of the members 84 and 86 together and there are rearwardly, downwardly and outwardly extending braces 90 connecting the upper end of the member 86 with the rear transverse frame member 16. The parts are secured together by any suitable means such as, for example, welding or brazing. Within the roll bar assembly and adjacent the rear end of the car is a seat 92 suitably secured to the longitudinally extending inner frame members 24 and 26. If desired, all or portions of the space enclosed by the outer frame and roll bar may be enclosed to give a conventional apprearance.

The vehicle is provided with clutch means which comprises a pulley 100, rotatably mounted on a lever 102 adjacent the inner end thereof, said pulley is in alignment with the belt 38. Lever 102 is pivotally connected intermediate its ends by a pivot pin 104 to a bar 106, the ends of which are secured to transverse frame members. The end of lever 102 opposite pulley 100 is operably connected to a clutch pedal 108, pivotally mounted in a yoke 100 secured to an adjacent part of the frame, the arrangement being of well-known character and, when the clutch pedal 108 is out, a spring, not shown, moves the clutch pedal to its out position whereat the belt 38 is tight, for the transmission of power from the engine to the transmission. When the clutch pedal 108 is actuated, the lever 102 is actuated in counterclockwise direction to loosen the belt, so power from the engine is not transmitted to the transmission 30.

Thus, the power train of the vehicle or car includes the engine, the transmission 30, the driving connection between the engine and transmission, the differential, the connection between the transmission and differential and the rear axles and wheels of the vehicle.

There is an accelerator pedal 114 having the usual operating connection 116 with the carburetor, not shown, of the engine 42.

In this form of my invention, the transmission 30 is of such character that it cannot be shifted while the vehicle or car is in motion but can be and is shifted, when the car is not in motion, to any of the forward positions or the reverse position. Consequently, in order for the trainee to become familiar with the actual operation of a stick transmission, a dummy shifting mechanism, indicated generally at 126, is provided.

Figure 4:
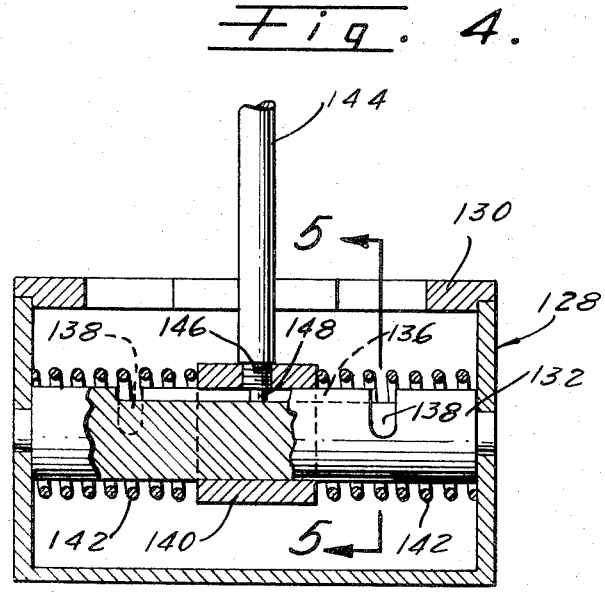
FIG. 4 is an enlarged sectional view taken on line 4—4 of FIG. 2.
Figure 5:
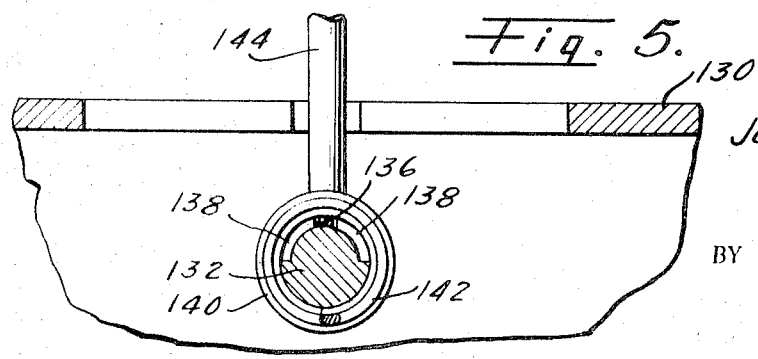
FIG. 5 is an enlarged sectional view taken on line 5—5 of FIG. 4.

This dummy shifting mechanism, as best shown in FIGS. 1, 4 and 5, has a housing 128, the top plate 130 of which has an H-shaped opening. A shaft 132 is secured within the housing and said shaft has a longitudinally extending external groove 136, in alignment with the horizontal part of the H-shaped opening in the top plate 130 of the housing 128. Adjacent each end of groove 136 are oppositely extending grooves 138 which are in operable alignment with the parallel parts of the H-shaped opening in the top plate 130. Slidable longitudinally on the sleeve 134 and rotatably, thereon, is a collar 140 which is normally centered on said shaft 132 by spring 142 reacting between ends of the collar and adjacent side walls of the housing. While said springs 142 center the collar on the shaft 132, they permit the collar to be shifted longitudinally on said shaft and, also, permit rotary movement of the collar. A stick or shift lever 144 for actuating the collar has a lower end portion 146 of reduced diameter and externally threaded for threadable reception in a tapped bore provided therefor in said collar. Stick or shift lever 144, also, has a reduced diameter part 148 extending from the threaded end portion 146 which is adapted to slide within the grooves 136 and 138, so that the stick may be moved in the respective parts of the H-shaped opening in the top plate 130. Thus, the trainee can manipulate the shift lever 144 in the normal manner for a stick shift transmission. While shifting the dummy transmission, the operator is trained to manipulate the clutch to declutch while shifting from one gear to another.

There is an important safety factor in having the transmission set for a specific position from which the student operator does not shift while the car is in motion. For example, the student starts out in first gear and drives in this gear. With the car in first gear, its speed will not be great and the student can concentrate on operating the car without danger. As the student becomes more proficient, a higher gear may also be used.

In a modified form of my invnetion a conventional three-speed transmission is substituted for the transmission 30 and may have a top plate 130 with an H-shaped opening such as shown in FIG. 1 for the dummy shift stick 144. A conventional clutch operable by the clutch pedal 108 may also be used.

If the moving-vehicle phase of the driver instruction is being conducted in an automobile having a multiple gear transmission, it is desirable in the early stages of instruction to provide a lockout device to restrict the range of gear movements available to the pupil so that he is restricted to the lower speed modes of operation of the automobile. Such a lockout device is illustrated in FIGS. 9 and 10 shown applied to a four-speed gear box. The gear box has a gearshift lever movable along fixed paths (shown in dotted lines in FIG. 9) from a NEUTRAL gearshift position N to gearshift positions REVERSE, FIRST, THIRD and SECOND which are spaced in anticlockwise distribution about the corners of a rectangle (indicated at R, 2, 3 and 1 on FIG. 9). The gear box also includes a FOURTH gearshift position located outside the rectangle defined by the other gearshift positions and spaced in adjacent relation to the SECOND gearshift position and in general alignment with the side of the rectangle extending between the gearshift positions for REVERSE and SECOND gear. The lockout device includes a generally rectangular bar 145 having pins 146 slidably received within mating sockets formed in the gear box housing. The bar 145 extends between the SECOND and FOURTH gearshift postion extending in generally parallel relation to the side of the rectangle extending between the SECOND and THIRD gearshift positions and thus prevents motion of the gearshift lever to the FOURTH gearshift position. Pivotally secured to the upper surface of the bar 145 is an L-shaped plate 147 which may be locked, by a detent 148, in a position in which it blocks passage of the gearshift lever to the THIRD gear position. Thus, with the latch 147 set in position, the pupil is restricted, as far as forward motion is concerned, to motion with the gearshift in the FIRST and SECOND gearshift positions thereby imposing an effective speed limit during the instructional period. If desired, the L-shaped arm 147 may be lifted upwardly against the action of a spring 149 so that it can clear the detent 148 and be swung out of the way to enable the gearshift lever to be moved to the THIRD gearshift position also.

Referring now to the driving range shown in FIG. 6, there are various patterns shown for training exercises for the various traffic situations encountered in regular driving on streets, highways, roads and freeways.

The driving range is an isolated hard-surfaced area and patterns are painted or otherwise put on the range, which is what I term a mini or miniature range scaled to the mini-car used, thereon. For example, for a mini-car of approximately 50-55 inches in width, 9 foot simulated street lanes may be used instead of the usual 12 to 15 foot lanes. With an 18 foot simulated street (two lanes) the turning radius of the mini-car should be 18 feet or slightly less, so that the student can learn to do U-turns.

The range has a garage or observatory 150 from which the trainees start and there are various lanes for traffic, including single lanes 152, double lanes 154 and triple lanes, indicated at 156. The observatory 150 should have an elevated deck portion or tower which permits the instructor to readily observe and communicate with the several students being trained at the same time on the range. Left turns are provided for, such as at 158 and 160, for example. Also, at 160 there is ice provided on the lanes, water being sprayed onto the paving and frozen by means of refrigerating coils embedded in the paving.

A double garage is shown at 162 to train the student to back in and out. A parallel parking area is provided at 164 and a blind typebarrier is shown at 166 at an intersection 168. There is a "*t*" exercise at 170 to provide for blind intersections and dead ends.

There is, also, a multiple lane left turn area 172 and an exercise "X" at 174 for training the meeting of traffic at unmarked intersections. A figure 8" exercise area 176 provides for steering and backing, and a "Y" turn area 178 provides for narrow turn exercises.

Various signs are provided, such as hexagonal stop signs "S" and triangular yield signs with a "Y," and familiar roadside objects such as fence posts, telephone poles and the like, all disposed in correlation with the maximum driving speed and stopping time of the cars. There are, also, traffic lights 180 with the usual red, green and amber lights.

Other patterns may, also, be provided.

There can be and usually are a plurality of cars on the driving range, since with my system, a single instructor can readily handle as many as 12 students at once by the use of a megaphone loud speaker or radio connection to each mini-car.

The mini or miniature cars are small and for one operator under complete control at all times and are much safer to use than the cars heretofore used. Further they are relatively inexpensive so that there is a big saving in the cost of the driver education program using it. Preferably, the brakes of the car are adjusted to correlate with the maximum speed of the car and the size of the driving range so that the stopping time is proportional to that of larger cars of higher speeds. Thus, the student develops a feel for the required stopping times for large conventional cars.

I claim:

1. A method of teaching a pupil to drive, which includes,
   providing a tethered automobile mounted on a stationary platform with the automobile front wheels resting upon rollers which enable the front wheels to turn without movement of the automobile along the ground,
   applying driving force to rotate the front wheels of the automobile while enabling the pupil to conduct steering movement of the front wheels from side to side,
   positioning a driving range within the range of vision of the pupil in the tethered automobile,
   causing a second automobile to be driven along a predetermined path of movement on the driving range while under the observation of the pupil in the tethered automobile; and
   causing the pupil to perform steering motions in the tethered automobile corresponding to the observed movements of the second automobile.

2. A method as defined in claim 1, wherein
   the driving force applied to rotate the front wheels is variable in proportional response to movement of the automobile accelerator by the pupil,
   the method including the additional step of
   instructing the pupil to coordinate the movement of the accelerator with the steering movement of the front wheels to relate the driving force applied to the front wheels to the steering movement thereof.

* * * * *

PO-1050
(5/69)

UNITED STATES PATENT OFFICE
CERTIFICATE OF CORRECTION

Patent No. 3,849,908             Dated November 26, 1974

Inventor(s) JAMES L. STURGEON

It is certified that error appears in the above-identified patent and that said Letters Patent are hereby corrected as shown below:

Col. 5, line 66, after "driving" and before "and" insert --range--.

Col. 7, line 54, after "stick" and before "transmission" insert --shift--.

Signed and sealed this 18th day of February 1975.

(SEAL)
Attest:

RUTH C. MASON
Attesting Officer

C. MARSHALL DANN
Commissioner of Patents
and Trademarks